(12) United States Patent
Sadri et al.

(10) Patent No.: US 9,371,044 B1
(45) Date of Patent: Jun. 21, 2016

(54) VEHICLE PANEL AND EMBLEM

(71) Applicant: Ford Global Technologies, LLC., Dearborn, MI (US)

(72) Inventors: Hossein Jacob Sadri, Novi, MI (US); Geoffrey John Cooper, Canton, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 19 days.

(21) Appl. No.: 14/576,417

(22) Filed: Dec. 19, 2014

(51) Int. Cl.
| | | |
|---|---|---|
| *B60R 13/00* | (2006.01) | |
| *B62D 33/03* | (2006.01) | |
| *B62D 33/027* | (2006.01) | |
| *B62D 25/00* | (2006.01) | |

(52) U.S. Cl.
CPC .............. *B60R 13/005* (2013.01); *B62D 25/00* (2013.01); *B62D 33/0273* (2013.01)

(58) Field of Classification Search
CPC ...... B60R 13/00; B60R 13/005; B60R 13/04; G09F 3/12; B62D 25/00; B62D 33/023; B62D 33/027; B62D 33/0273; B62D 27/03
USPC ........... 296/50, 57.1, 1.07, 1.08, 191; 40/590, 40/591, 910, 911
See application file for complete search history.

(56) References Cited

U.S. PATENT DOCUMENTS

| | | | | |
|---|---|---|---|---|
| 1,763,674 | A * | 6/1930 | Ross ..................... | B60R 13/005 40/662 |
| 1,793,804 | A * | 2/1931 | Hyatt ..................... | B60R 13/005 40/662 |
| 4,033,619 | A * | 7/1977 | Cox ......................... | B60R 13/00 296/21 |
| 4,400,417 | A * | 8/1983 | Kanamori ............. | B60R 13/005 280/727 |
| 4,756,106 | A * | 7/1988 | Foster ..................... | G09F 21/04 40/490 |
| 5,673,960 | A * | 10/1997 | Sorensen .............. | B60P 1/4492 280/770 |
| 5,857,724 | A * | 1/1999 | Jarman ................. | B62D 33/037 296/26.11 |
| 7,213,833 | B2 | 5/2007 | Amamori | |
| 7,854,457 | B2 * | 12/2010 | Tanner ................... | B60K 20/02 180/336 |
| 7,921,563 | B2 | 4/2011 | Doroghazi et al. | |
| 8,038,204 | B1 * | 10/2011 | Baker ..................... | B60R 13/00 296/1.08 |
| 9,150,165 | B1 * | 10/2015 | Fortin ................... | B60R 13/005 |
| 2003/0079381 | A1 | 5/2003 | Arens et al. | |
| 2008/0005874 | A1 * | 1/2008 | Keller et al. .......... | B60R 13/005 24/458 |
| 2009/0021038 | A1 * | 1/2009 | Ohzono ................... | B62J 17/02 296/37.16 |

(Continued)

FOREIGN PATENT DOCUMENTS

| | | |
|---|---|---|
| CN | 201494380 U | 6/2010 |
| CN | 203305927 U | 11/2013 |

(Continued)

*Primary Examiner* — Gregory Blankenship
(74) *Attorney, Agent, or Firm* — Jason Rogers; Brooks Kushman PC

(57) ABSTRACT

An emblem assembly for a vehicle having a number of attachment features such as two locating-pins, two opposing force clips, an orthogonal force clip, and an adhesive. A body panel having an embossed emblem-mating surface defining a number of attachment features such as a 2-way locating-slot, a 4-way locating-hole, a central void with opposing substantially parallel edges, a clip retention slot with an orthogonal edge, and a panel surface area for adhesive contact. The emblem assembly and the emblem-mating surface features combine to provide an effective support for an emblem on a body panel of a vehicle. The emblem may be located on a tailgate of a pickup with an aluminum body panel.

19 Claims, 2 Drawing Sheets

(56) References Cited

U.S. PATENT DOCUMENTS

| | | | |
|---|---|---|---|
| 2009/0140549 A1* | 6/2009 | Doroghazi | B60R 13/005 296/193.1 |
| 2011/0059271 A1* | 3/2011 | Custer | B60R 13/00 428/31 |
| 2013/0107046 A1* | 5/2013 | Forgue | B60R 11/04 348/148 |
| 2015/0069740 A1* | 3/2015 | Onohara | B60R 21/203 280/728.3 |
| 2015/0241016 A1* | 8/2015 | Sura | B60R 13/005 362/509 |

FOREIGN PATENT DOCUMENTS

| | | | | |
|---|---|---|---|---|
| DE | 102011051429 A1 | 1/2013 | | |
| EP | 0965489 A1 | 12/1999 | | |
| JP | 2009-120122 A | * | 6/2009 | B60R 13/00 |
| JP | 2009126276 A | | 6/2009 | |

* cited by examiner

VEHICLE PANEL AND EMBLEM

TECHNICAL FIELD

This disclosure relates to emblems attachable to vehicles, and more specifically to an emblem and body panel structure each designed to allow the emblem to be attached to the panel efficiently with high quality fit and function.

BACKGROUND

Pickup trucks are motor vehicles with a front passenger area, often referred to as a cab, and an open top rear cargo area, often referred to as a box. The box typically has a substantially flat bed from which two sidewalls and a forward interconnecting headboard extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in so many different ways, including carrying a variety of types of cargo and towing various types of trailers.

Traditionally the majority of body structures on pickup trucks have been formed from steel alloys. Through years of experience, pickup truck designers have learned how to engineer steel truck body parts that withstand the variety of demanding pickup truck applications. The current regulatory and economic environments have increased the importance of making pickup trucks more fuel efficient as well as functional and durable. One way to reduce the fuel consumption of a vehicle is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. As well, fabrication techniques and methods of joining parts that work well for steel parts may not work well for the same aluminum part. Due to these and other differences, simple material substitution does not necessarily produce an acceptable design.

Oil canning is a phenomenon that may occur when light-gauge metal is used in flat structures. Internal stresses in the metal may cause the material to bulge inwardly or outwardly in localized areas and oscillate back and forth. These bulges/oscillations may be visible, especially under certain lighting conditions. Furthermore, a transition from an inward bulge to an outward bulge, or vice versa, may produce a popping sound. Oil canning may be more prevalent in aluminum structures than steel structures of the similar shapes and sizes. Although oil canning does not alter objective measures of structural integrity, it may be perceived by consumers as an indication of lower quality.

Manufacturers of pickup trucks often like to place an emblem or badge on an external tailgate panel to provide information as to the make or model of the pickup truck. The emblems have a shape and weight and may increase the opportunity for oil canning when placed on a flat structure. The emblem may also extend outwardly from the surface of the metal also increasing an opportunity for oil canning. As well, other components, such as lights or cameras, may be included as part of the emblem structure adding even more weight and complexity to the emblem and a yet even greater potential for the oil canning phenomenon.

SUMMARY

One aspect of this disclosure is directed to a tailgate for a pickup. In this aspect, the tailgate has a panel having a primary surface, such as a class-A exterior body surface. The panel for this tailgate may be aluminum. The panel also has an emblem-mating surface offset from the primary surface. The emblem-mating surface defines a central void with opposing edges. The emblem-mating surface also defines a clip-retention slot with an orthogonal edge. An emblem assembly is located on the tailgate. The emblem assembly has first and second clips each contacting one of the opposing edges. The emblem assembly also has a third clip engaging the clip-retention slot.

The void may be substantially quadrilateral in shape, and more specifically, the void may be substantially rectangular in shape. The opposing edges of the void may extend in a parallel direction relative each other. The void may have two lateral edges extending perpendicular to the opposing edges, and a distance between the opposing edges is further than a distance between the lateral edges. The lateral edges are not necessarily continuous and may be interrupted.

The void may define a first area of open space. The emblem-mating surface minus the void may define a second area of panel material. The first area may be equal to or greater than the second area. The emblem assembly may have a panel-mating surface and the tailgate may further comprise an adhesive disposed between a portion of the panel-mating surface and a portion of the emblem-mating surface.

The emblem-mating surface may further define a 4-way locating-hole and a 2-way locating-slot. The 2-way locating-slot may have a substantially straight length longer then a width. The 4-way locating-hole may be substantially circular. The 2-way locating-slot may define a mounting axis extending down a center of the length of the slot. The 4-way locating-hole may be located substantially in-line with the mounting axis. The emblem assembly may further include first and second locating-pins disposed in the 4-way locating-hole and 2-way locating-slot, respectively. The 4-way locating-hole and 2-way locating-slot may be disposed in the emblem-mating surface adjacent the opposing edges. The first and second clips may be disposed in-line with the mounting axis.

Another aspect of this disclosure is directed to an emblem assembly for an automobile. This emblem assembly has a panel-mating surface. The emblem assembly has two clips extending from the panel-mating surface. The two clips are capable of providing opposing-force towards each other along an axis. The emblem assembly has a third clip extending from the panel-mating surface. The third clip is capable of providing a force substantially perpendicular to the axis. The emblem assembly also has two locating-pins extending from the panel-mating surface. The two locating pins are disposed along the axis outwardly from the two clips.

The emblem assembly may have an adhesive disposed on a portion of the panel-mounting surface and a disposable pull sheet disposed on the adhesive. Each of the two clips may have a first end connected to the panel-mating surface, and a first segment extending away from the first end to a bend segment. The clips may also have a second segment extending from the bend segment back toward the panel-mating surface to a second end. The second end of each opposing-force clip is offset from the panel-mating surface and disposed outwardly from each respective first end along the axis. Each second segment may have an opposing edge contact surface configured to engage a body panel of an automobile.

The third clip may have a proximal end in contact with the panel-mating surface. The third clip may have two leg segments extending outwardly from the proximal end to a distal end. The third clip may also have a center segment disposed between the leg segments extending from the distal end back toward the panel-mounting surface. The leg segments may be substantially flat and configured to contact a primary edge of a clip-retention slot in a body panel. The center segment may be notched and configured to contact a secondary edge of the clip-retention slot in the body panel.

The two locating-pins may be generally circular having substantially similar diameters. A first of the two locating-pins may be configured to be disposed in a 4-way locating-hole in the body panel. The 4-way locating-hole having a diameter larger than the diameter of either of the two locating-pins. A second of the two locating-pins may be configured to be disposed in a 2-way locating-slot in the body panel. The 2-way locating-slot having a width larger than the diameter of either of the two locating-pins.

A further aspect of this disclosure is directed to a stamped aluminum body panel. The stamped aluminum body panel has a primary surface. The stamped aluminum body panel also has an emblem-mating surface embossed into the primary surface. A void is defined within a central region of the emblem-mating surface. The void is defined between substantially parallel opposing edges. A clip-retention slot is also defined within the emblem-mating surface. The clip-retention slot is defined on one side by an orthogonal edge. The orthogonal edge is substantially parallel to the opposing edges. A 2-way locating-slot and a 4-way locating-hole are further defined within the emblem-mating surface. The 2-way locating-slot and a 4-way locating-hole are each adjacent to one of the opposing edges.

The void may define a first area of open space. The emblem-mating surface may define a second area of body panel. The first area may be equal to or greater than the second area. The emblem-mating surface may be configured to have an emblem adhesively applied thereto and the first and second areas are sized accordingly to reduce potential oil canning of the aluminum body panel due to a mass of the emblem.

Center points of the 2-way locating-slot and 4-way locating-hole may define an axis extending therethrough. The 2-way locating-slot may have a length along the axis longer than a width across the axis. A portion of each opposing edge may also extend substantially orthogonal to the axis along the axis.

The emblem-mating surface may be embossed inwardly from the primary surface in vehicle position. A stamped intermediate perimeter may also extend between the primary and emblem-mating surfaces.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
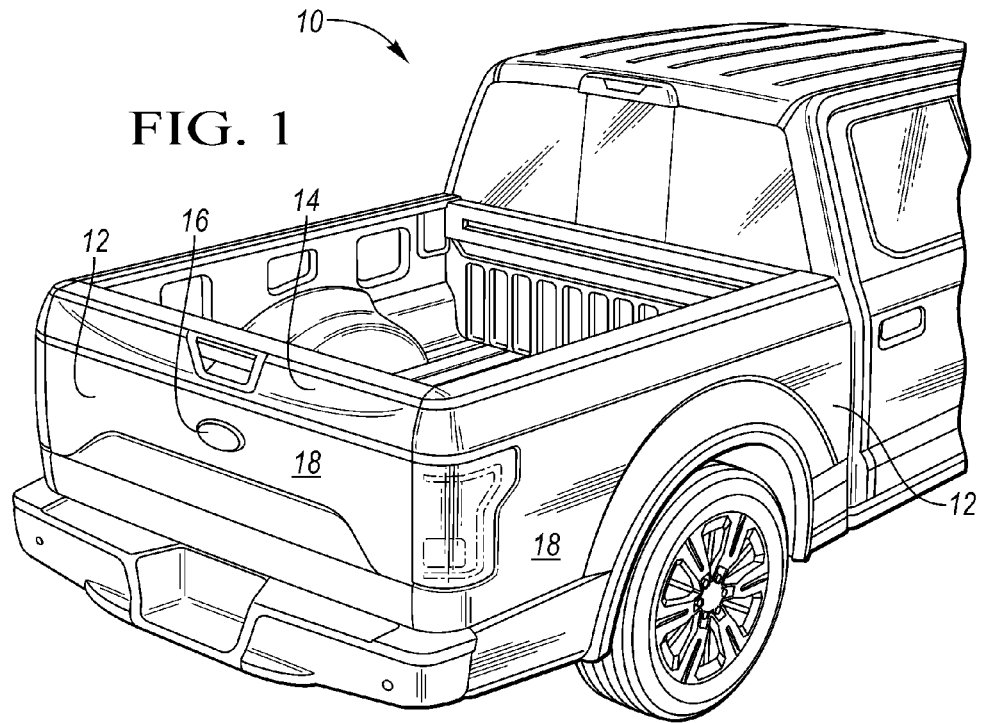
FIG. 1 is a partial rear perspective view of a pickup truck having a tailgate with an emblem on the tailgate.

FIG. 1 shows a vehicle 10 having a number of body panels 12. In this specific example, the vehicle 10 is a pickup truck and one of the body panels 12 is shown as being part of a tailgate assembly 14. The body panels 12 may be formed from a number of different materials, such as polymers, plastics, composites, fiberglass, metals, or the like, or any combination of the above. Common metals used for vehicle body panels 12 are steel and aluminum alloys, although other metals have been used and are contemplated. Body panels 12 may also be formed by a number of different manufacturing methods such as, but not limited to, stamping, extruding, forging, casting and molding.

The body panel 12 on the tailgate assembly 14 is shown with an emblem 16 mounted thereon. The body panels 12 are shown with a primary surface 18. A primary surface 18 may be defined as any surface on a body panel 12 visible by a person in the normal viewing of the vehicle. Primary surfaces 18 are often primed, painted and clear coated to provide a class-A appearance. A primary surface 18 of a body panel 12 may be susceptible to oil canning on a vehicle, and the chance for oil canning may be increased by an emblem 16 being mounted onto the panel 12.

Figure 2:
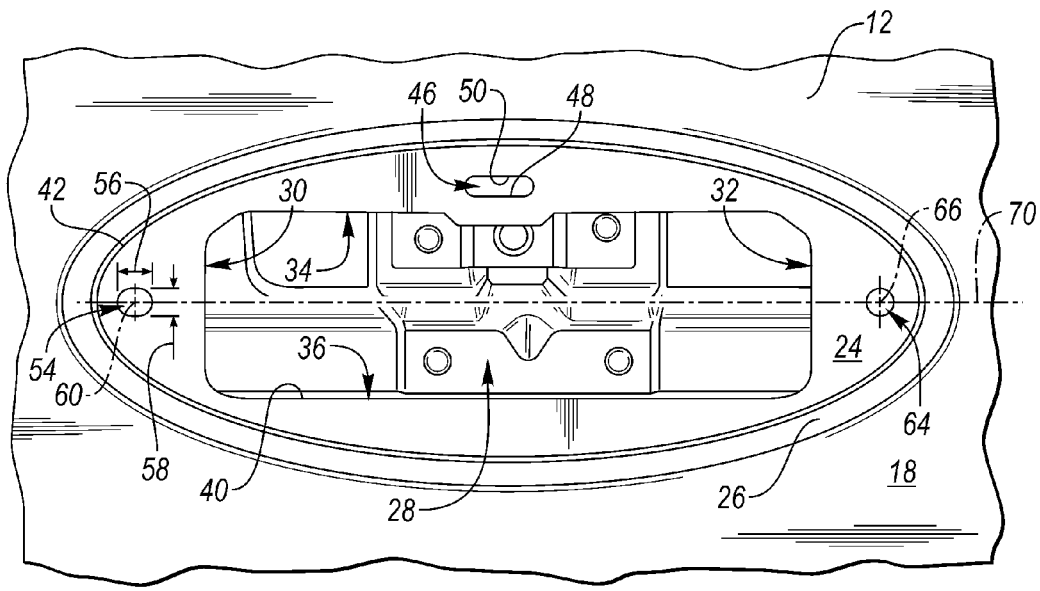
FIG. 2 is a partial view of a tailgate structure for receiving an emblem.

FIG. 2 shows a panel 12 with emblem 16 removed or not yet installed. An emblem-mating surface 24 is shown offset from the primary surface 18. The emblem-mating surface 24 may be embossed into the primary surface 18 during forming of the panel 12. A stamped intermediate perimeter 26 may extend between the primary surface 18 and the emblem-mating surface 24. Transitional bend radii may be used for efficiently stamping the panel 12 depending on the material and thickness of the panel 12. The intermediate perimeter 26 may provide structural stability and reduce the propensity for a panel 12 to oil can in the area of the intermediate perimeter 26. The emblem-mating surface 24 may also be embossed inwardly from the primary surface 18, when in vehicle position, such that an emblem assembly 16 may be inset into a pocket formed by the offset emblem-mating surface 24.

The emblem-mating surface 24 defines a void 28. The void 28 may be substantially centrally located in the emblem-mating surface 24. The void 28 is at least partially defined by first and second edges 30, 32. The first and second edges 30, 32 are opposing edges 30, 32. The first and second edges 30, 32 may extend in a substantially parallel direction relative to each other. The void 28 may also be at least partially defined by third and fourth edges 34, 36. The third and fourth edges 34, 36 may be two lateral edges 34, 36. The third and fourth edges 34, 36 may also extend in a substantially parallel direction relative to each other.

The third and fourth edges 34, 36 may extend in a substantially perpendicular direction relative to the first and second edges 30, 32. The lateral edges 34, 36 are not necessarily continuous between the opposing edges 30, 32 and may be interrupted by ears, tabs or detents. The void 28 may be substantially quadrilateral in shape, as shown. The void may be substantially rectangular in shape, as shown. A first distance between the opposing edges 30, 32 (i.e., length of the void 28) may be further than a second distance between the lateral edges 34, 36 (i.e., width of the void 28). The void 28 may be further partially defined by corners extending between the edges 30, 32, 34, 36. These corners may have forming radii conducive to a blanking or punching operation performed while stamping the panel 12.

A first area 40 may be defined by the void 28. The first area 40 is of the open space between the edges 30, 32, 34, 36 and corners (i.e., the perimeter of the void 28). A second area 42 may be defined by the emblem-mating surface 24 minus a void 28. The second area 42 may be defined as the physical surface of the body panel 12 disposed within and surrounded by the intermediate perimeter 26. The second area 42 does not include the first area 40. The second area 42 may have all of the voids, slots and holes that are defined by the emblem-mating surface 24 removed from the calculation. The first area 40 may be substantially equal to or greater than the second area 42. Thus the void 28 and emblem-mating surface 24 are sized accordingly to reduce potential oil canning of the body panel 12 if the emblem 16 is adhesively applied to the panel 12.

A clip-retention slot 46 may be defined by the emblem-mating surface 24. The clip-retention slot 46 may be at least partially defined by a primary edge 48. The primary edge 48 may extend in a direction substantially parallel to the opposing first and second edges 30, 32. The primary edge 48 may also be referred to as an orthogonal edge 48. The clip-retention slot 46 may also be at least partially defined by a secondary edge 50. Secondary edge 50 may oppose primary edge 48. Secondary edge 50 may extend in a substantially parallel direction to the primary edge 48.

A 2-way locating-slot 54 may be defined by the emblem-mating surface 24. The 2-way locating-slot 54 may be disposed adjacent one of the first or second edges 30, 32. The 2-way locating-slot 54 has a length 56 and a width 58. The length 56 may be substantially straight and greater in distance than the width 58. A center point 60 may be located half way between the length 56 and width 58.

A 4-way locating-hole 64 may be defined by the emblem-mating surface 24. The 4-way locating-hole 64 may be disposed adjacent one of the first or second edges 30, 32. The 4-way locating-hole 64 may be disposed adjacent one of the first or second edges 30, 32 opposite to the location of the 2-way locating-slot 54. The 4-way locating-hole 64 may be substantially circular with a center point 66 located at the center of the circular shape.

An axis 70 may be defined as a substantially straight line extending through the center point 60 of the 2-way locating-slot 54 and the center point 66 of the 4-way locating-hole 64 in which the length 56 of the 2-way locating-slot 54 extends along the axis 70. Alternatively, a mounting axis 70 may be defined by extending a line down a center of the length 56 of the 2-way locating-slot 54 and then locating the 4-way locating-hole 64 substantially in-line with the mounting axis 70. The center point 66 of the 4-way locating-hole 64 may be disposed directly in-line with the mounting axis 70.

The width 58 of the 2-way locating-slot 54 may be substantially similar to a diameter of the 4-way locating-hole 64. The width 58 of the 2-way locating-slot 54 may be sized similar to, but slightly larger than, a locating-pin disposed therein. The diameter of the 4-way locating-hole 64 may be sized similar to, but slightly larger than, a locating-pin disposed therein. A portion of each opposing first and second edges 30, 32 may cross the axis 70 and extend substantially perpendicular to the axis 70 at the locations where they cross the axis 70.

Figure 3:
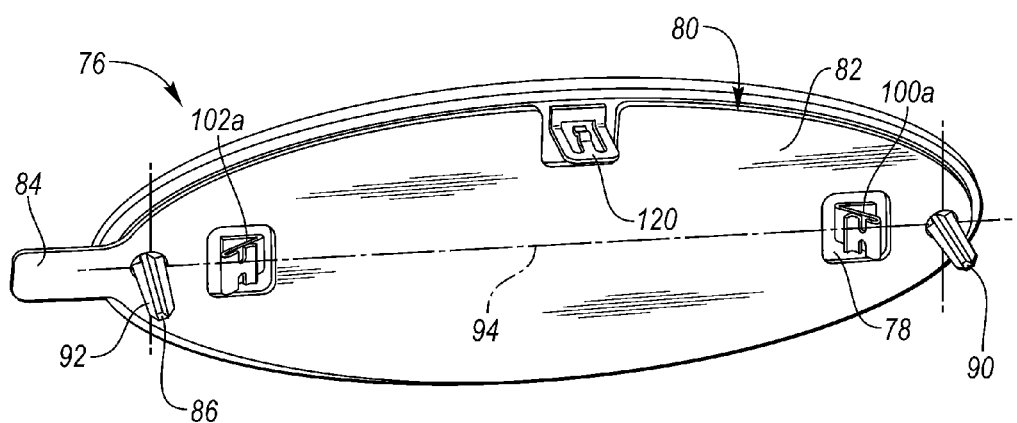
FIG. 3 is a rear view of an emblem assembly that cooperates with the tailgate structure of FIG. 2
Figure 4:
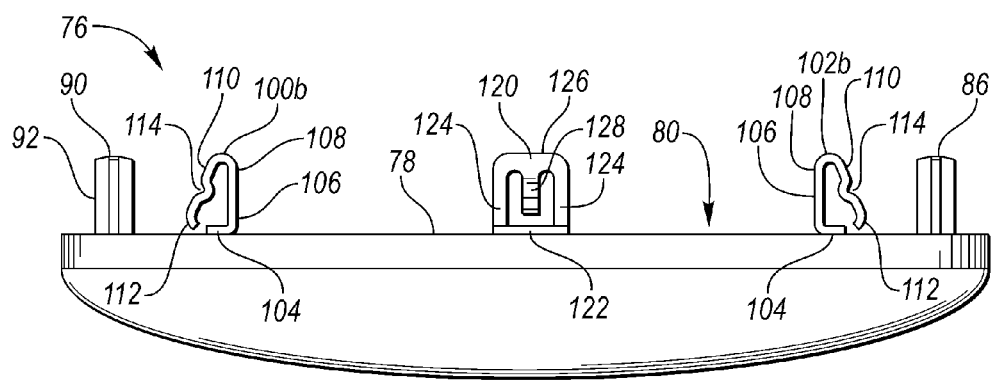
FIG. 4 is a top view of an emblem assembly.

FIGS. 3 and 4 show an emblem assembly 76. Emblem assembly 76 may be similar to emblem 16. Emblem assembly 76 has a panel-mounting surface 78. A portion of the panel-mounting surface 78 may be configured to contact a body panel 12 (see FIG. 1). A portion of the panel-mounting surface 78 may be configured to contact an emblem-mating surface 24 (see FIG. 2). The portion of the panel-mounting surface 78 in contact with the body panel 12 or emblem-mounting surface 24 may be substantially flat. The entire panel-mounting surface 78 may be substantially flat.

An adhesive 80 may be disposed on portions of the panel-mounting surface 78. A disposable pull sheet 82 having a pull tab 84 (see specifically FIG. 3) may be disposed on top of the adhesive 80 to cover the adhesive 80 before installation of the emblem assembly 76 to a vehicle 10. The pull tab 84 may extend outwardly past the panel-mating surface 78 for enhanced finger grip. Alternatively, the adhesive 80 may be applied to the body panel 12 such that the emblem assembly 76 does not have any adhesive 80 while still providing some adhesive 80 at least partially disposed between the panel-mating surface 78 of the emblem assembly 76 and the body panel 12 of the vehicle 10 when installed (see FIG. 1). Although adhesive may improve the interaction between the emblem assembly 76 and the body panel 12, adhesive may not be used at all.

First and second locating-pins 86, 90 extend from the panel-mating surface 78. The locating-pins 86, 90 may have a number of projecting ribs 92, such that from the top the projecting ribs resemble a triangle, a plus, a 5-point star, a 6-point star, etc. The projecting ribs 92 extend radially outward from a center providing a substantially circular outer perimeter surface of the locating-pins 86, 90 with a diameter. Locating-pins 86, 90 may have substantially similar diameters relative to each other. A substantially straight emblem axis 94 may extend through center points of the locating-pins 86, 90 along the panel-mounting surface 78.

The locating-pins 86, 90 are configured to be disposed within and cooperate with the 4-way locating-hole 64 and 2-way locating-slot 54 defined by the emblem-mating surface 24 of the body panel 12 (see FIG. 2). The first locating-pin 86 may be disposed in the 4-way locating-hole 64 (see FIG. 2). The 4-way locating-hole 64 may have a diameter slightly larger than the diameter of the first locating-pin 86. The second locating-pin 90 may be disposed in the 2-way locating-slot 54 (see FIG. 2). The 2-way locating-slot 54 may have a width 58 slightly larger than the diameter of the second locating-pin 90. When the two locating-pins 86, 90 cooperate with the two locating-hole/slots 54, 64, the emblem axis 94 will substantially align with the mounting axis 70 (see FIG. 2).

First and second clips 100, 102 may be in contact with and extend from the panel-mating surface 78. The first and second clips 100, 102 are capable of providing opposing-force towards each other along axis 94. The first and second clips 100, 102 are configured to contact the first and second edges 30, 32, respectively, of the void 28 (see FIG. 2). The first and second clips 100, 102 may be disposed in-line with the mounting axis 70 (see FIG. 2) when the emblem assembly 76 is installed on a vehicle panel 12. First and second clips 100, 102 may be coated to prevent any potential corrosion issue. Two examples of first and second clips 100, 102 are shown in FIGS. 3 and 4, with clips 100*a* and 102*a* being in FIG. 3 and clips 100*b* and 102*b* being in FIG. 4.

Referring to FIG. 3, The first and second clips 100*a*, 102*a* may be mirror images of each other connected to and extending away from the panel-mounting surface 78. The clips 100*a*, 102*a* may extend away from the panel-mounting surface 78 at an angle, and extend away from each other. The clips 100*a*, 102*a* may be elastically deformable and provide a spring force tension against the first and second edges 30, 32 of the void 28 (see FIG. 2) providing a spring force that pulls the emblem assembly 76 toward the vehicle.

Referring to FIG. 4, the first and second clips 100*b*, 102*b* may be mirror images of each other having a first end 104 connected to the panel-mating surface 78. Each of the first and second clips 100, 102 may have a first segment 106 extending away from the first end 104 to a bend segment 108. The first and second clips 100, 102 may also have a second segment 110 extending from the bend segment 108 back toward the panel-mating surface 78 to a second end 112. The second ends 112 may be offset from the panel-mating surface 78. The second ends 112 may be disposed outwardly from each respective first end 104 along the axis 94. The second end 112 may curve back toward the first end 104 or first segment 106. The first and second clips 100, 102 may have an opposing edge contact surface 114 configured to engage a body panel 12 of a vehicle 10. The edge contact surface 114 may be a notch or bend in the second segment 110.

Referring again to both FIGS. 3 and 4, a third clip 120 may be in contact with and extend from the panel-mounting surface 78. The third clip 120 may be capable of providing a force substantially perpendicular to the axis 94. The third clip 120 is configured to engage a clip-retention slot 46 on a body panel 12 (see FIG. 2). It is also envisioned that the third clip 120 may be configured to engage one of the third and fourth edges 34, 36 of the void 28 (see FIG. 2).

The third clip 120 may have a proximal end 122 in contact with the panel-mating surface 78. Two leg segments 124 may extend outwardly from the proximal end 122 to a distal end 126. A center segment 128 may be disposed between the leg segments 124 extending from the distal end back 126 toward the panel-mounting surface 78. The center segment 128 may be offset from the panel-mounting surface 78. The two leg segments 124 may be substantially flat and configured to contact a primary edge 48 of a clip-retention slot 46 in a body panel 12 (see FIG. 2). The center segment 128 may be notched and configured to contact a secondary edge 50 of the clip-retention slot 46 in the body panel 12 (see FIG. 2).

The emblem assembly 76 has a mass that is supported by, is in contact with, and extends outwardly from a body panel 12 (as emblem 16 is shown in FIG. 1). Emblem assembly 76 may also contain additional componentry such as a rear view camera. Additional componentry may increase the mass of the emblem assembly 76 and may increase the outward extension of the emblem assembly 76 from the body panel 12. The emblem assembly 76 and the body panel 12 may be improved by any combinations of the above features to provide a lower cost quality attachment while also maintaining high appearance standards and reducing potential oil-canning of the body panel.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A tailgate for a pickup comprising:
 a panel having an emblem-mating surface offset from a primary surface, the emblem-mating surface defining a central void between opposing edges and a clip-retention slot with an orthogonal edge; and
 an emblem assembly having first and second clips each contacting one of the opposing edges, and a third clip engaging the clip-retention slot.

2. The tailgate of claim 1 wherein the void is substantially quadrilateral in shape.

3. The tailgate of claim 2 wherein the void is substantially rectangular in shape with the opposing edges extending in a parallel direction, and wherein the void has two lateral edges extending perpendicular to the opposing edges, and a distance between the opposing edges is further than a distance between the lateral edges.

4. The tailgate of claim 1 wherein a first area defined by the void is equal to or greater than a second area defined by the emblem-mating surface minus the void.

5. The tailgate of claim 1 wherein the emblem assembly has a panel-mating surface and the tailgate further comprises an adhesive disposed at least partially between the panel-mating surface and the emblem-mating surface.

6. The tailgate of claim 1 wherein the emblem-mating surface further defines a circular 4-way locating-hole and a 2-way locating-slot, the 2-way locating-slot having a substantially straight length longer then a width and the 4-way locating-hole, the 2-way locating-slot defining a mounting axis extending down a center of the length, and the 4-way locating-hole being located substantially in-line with the mounting axis, and the emblem assembly further has first and second locating-pins disposed in the 4-way locating-hole and 2-way locating-slot, respectively.

7. The tailgate of claim 6 wherein the 4-way locating-hole and 2-way locating-slot are disposed in the emblem-mating surface adjacent the opposing edges.

8. The tailgate of claim 7 wherein the first and second clips are disposed in-line with the mounting axis.

9. The tailgate of claim 1 wherein the panel is aluminum.

10. An emblem assembly for an automobile comprising:
 a panel-mating surface;
 two clips extending from the panel-mating surface and capable of providing opposing-force towards each other along an axis, wherein each of the two clips have a first end connected to the panel-mating surface, a first segment extending away from the first end to a bend segment, a second segment extending from the bend segment back toward the panel-mating surface to a second end, and the second end of each opposing-force clip is offset from the panel-mating surface and disposed outwardly from each respective first end along the axis;
 a third clip extending from the panel-mating surface and capable of providing a force substantially perpendicular to the axis; and
 two locating-pins extending from the panel-mating surface and disposed along the axis outwardly from the two clips.

11. The emblem assembly of claim 10 further comprising:
 an adhesive disposed on the panel-mating surface; and
 a disposable pull sheet disposed on the adhesive.

12. The emblem assembly of claim 10 wherein each second segment has an opposing edge contact surface configured to engage a body panel of an automobile.

13. The emblem assembly of claim 10 wherein the third clip has a proximal end in contact with the panel-mating surface with two leg segments extending outwardly therefrom to a distal end, and a center segment disposed between the leg segments extending from the distal end back toward the panel-mating surface.

14. The emblem assembly of claim 13 wherein the leg segments are substantially flat and configured to contact a primary edge of a clip-retention slot in a body panel and the center segment is notched and configured to contact a secondary edge of the clip-retention slot in the body panel.

15. The emblem assembly of claim 10 wherein the two locating-pins are circular having substantially similar diameters wherein a first of the two locating-pins is configured to be disposed in a 4-way locating-hole having a diameter larger than the diameter of either of the two locating-pins and a second of the two locating-pins is configured to be disposed in a 2-way locating-slot having a width larger than the diameter of either of the two locating-pins.

16. A stamped aluminum body panel comprising:
a primary surface;
an emblem-mating surface embossed into the primary surface;
a central void defined within the emblem-mating surface between substantially parallel opposing edges;
a clip-retention slot defined within the emblem-mating surface with an orthogonal edge substantially parallel to the opposing edges; and
a 2-way locating-slot and 4-way locating-hole defined within the emblem-mating surface, each adjacent to one of the opposing edges.

17. The aluminum body panel of claim 16 wherein the void defines a first area of open space and the emblem-mating surface defines a second area of body panel, wherein the first area is equal to or greater than the second area, and wherein the emblem-mating surface is configured to have an emblem adhesively applied thereto and the first and second areas are sized accordingly to reduce potential oil canning of the aluminum body panel due to a mass of the emblem.

18. The aluminum body panel of claim 16 wherein center points of the 2-way locating-slot and 4-way locating-hole define an axis extending therethrough, the 2-way locating-slot having a length along the axis longer than a width across the axis and a portion of each opposing edge is substantially orthogonal to the axis along the axis.

19. The aluminum body panel of claim 16 wherein the emblem-mating surface is embossed inwardly from the primary surface in vehicle position having a stamped intermediate perimeter extending between the primary and emblem-mating surfaces.

* * * * *